(12) United States Patent
Figueroa et al.

(10) Patent No.: US 7,861,535 B2  
(45) Date of Patent: Jan. 4, 2011

(54) SELF-ALIGNING LINER SUPPORT HANGER

(75) Inventors: Carlos G. Figueroa, Wellington, FL (US); Jeffrey S. Smith, Storrs, CT (US); Russell Nachtman, Jupiter, FL (US); Robert K. Hon, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 704 days.

(21) Appl. No.: 11/903,670

(22) Filed: Sep. 24, 2007

(65) Prior Publication Data  
US 2009/0077978 A1 Mar. 26, 2009

(51) Int. Cl.  
F02C 7/20 (2006.01)

(52) U.S. Cl. ........................................ 60/796; 60/766

(58) Field of Classification Search .............. 60/770, 60/771, 766, 796; 239/265.33, 265.37, 265.39; 16/224, 260, 261, 262, 270  
See application file for complete search history.

(56) References Cited

U.S. PATENT DOCUMENTS

| | | | | |
|---|---|---|---|---|
| 3,164,389 | A * | 1/1965 | Thomas | 277/635 |
| 4,506,648 | A * | 3/1985 | Roberts | 123/564 |
| 4,696,431 | A | 9/1987 | Buxe | |
| 4,903,476 | A | 2/1990 | Steber et al. | |
| 5,059,055 | A | 10/1991 | DeGress et al. | |
| 5,069,034 | A | 12/1991 | Jourdain et al. | |
| 5,101,624 | A | 4/1992 | Nash et al. | |
| 5,103,639 | A * | 4/1992 | Wolf | 60/771 |
| 5,329,763 | A * | 7/1994 | Ibarreche Mendia et al. | 239/265.35 |
| 5,596,870 | A | 1/1997 | Dillard et al. | |
| 5,813,609 | A | 9/1998 | Ellerhorst | |
| 6,041,590 | A | 3/2000 | Hayton et al. | |
| 6,067,793 | A * | 5/2000 | Urruela et al. | 60/230 |
| 6,199,371 | B1 | 3/2001 | Brewer et al. | |
| 6,945,496 | B2 * | 9/2005 | Reniau | 244/100 R |
| 7,017,334 | B2 | 3/2006 | Mayer et al. | |
| 2005/0155352 | A1 * | 7/2005 | Agg | 60/770 |
| 2005/0210864 | A1 * | 9/2005 | Lapergue et al. | 60/262 |
| 2006/0137324 | A1 | 6/2006 | Farah | |
| 2006/0179816 | A1 | 8/2006 | Murphy et al. | |
| 2007/0003411 | A1 | 1/2007 | Manzoori | |

OTHER PUBLICATIONS

Farah et al. Specification (17 Pages) and drawings (6 Sheets) for U.S. Appl. No. 11/326,004, entitled "Torque Load Transfer Attachment Hardware" and filed Jan. 5, 2006.

Farah et al. Specification (13 Pages) and drawings (5 Sheets) for U.S. Appl. No. 11/514,293, entitled "Damped Coil Pin for Attachment Hanger Hinge" and filed Aug. 31, 2006.

* cited by examiner

*Primary Examiner*—Michael Cuff  
*Assistant Examiner*—Phutthiwat Wongwian  
(74) *Attorney, Agent, or Firm*—Kinney & Lange, P.A.

(57) ABSTRACT

A self-aligning hanger for use in a gas turbine engine exhaust system comprises a first bracket, a second bracket, a rod, a first ball joint and a second ball joint. The first bracket is for connecting to an exhaust duct of the gas turbine exhaust system. The second bracket is for connecting to an exhaust duct liner of the gas turbine exhaust system. The rod extends between the first bracket and the second bracket. The first ball joint connects a first end of the rod with the first bracket. The second ball joint connects a second end of the rod with the second bracket.

22 Claims, 5 Drawing Sheets

SELF-ALIGNING LINER SUPPORT HANGER

STATEMENT OF GOVERNMENT INTEREST

This invention was made with Government support under Contract No. HR0011-04-9-0009 awarded by Defense Advanced Research Projects Agency (DARPA). The Government has certain rights in this invention.

BACKGROUND

This invention relates generally to gas turbine engines and more particularly to exhaust duct liner attachment systems and methods. In gas turbine engines, it is necessary to protect exhaust ducts with an insulating shield in order to prevent heated core gases from damaging the exhaust ducts. Typically, exhaust ducts are made from titanium-based alloys and have temperature limits of approximately 300° F. (~148.9° C.). Exhaust gases, however, reach much higher temperatures. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately 700° F. (~371.1° C.). In order to alleviate some of the heat from the exhaust gases imparted to the liner, cooling air is passed between the exhaust duct and liner. Thus, the exhaust duct and liner are subjected to different pressure and temperature gradients, which results in differing deflection and expansion of each body.

The differing deflections and expansions of the exhaust duct and liner are exacerbated by particular aircraft requirements. For military aircraft, it is sometimes desirable to have thrust vectoring capabilities or low radar signature profiles. Accordingly, the exhaust duct and liner must be tailored to meet these requirements. For example, thrust vectoring can be used for short take-off, vertical landing (STOVL) operations, which requires repositioning of the exhaust duct and nozzle. Additionally, low radar signature profiles require exhaust ducts to have streamlined shapes, which often require complex profiles that vary along the length of the duct.

In order to maintain the desired temperature and pressure profile along the exhaust duct and liner, it is necessary to maintain proper spacing between the exhaust duct and liner. The differing pressures, temperatures and functional requirements of the exhaust duct, however, produce three-dimensional forces between the duct and liner, which tend to shift the liner out of alignment. There is, therefore, a need for an exhaust duct liner suspension system that maintains proper spacing between an exhaust duct and a duct liner, while also permitting the liner to shift in other directions to accommodate, among other things, thermal growth.

SUMMARY

The present invention is directed towards a self-aligning hanger for use in a gas turbine engine exhaust system. The self-aligning hanger comprises a first bracket, a second bracket, a rod, a first ball joint and a second ball joint. The first bracket is for connecting to an exhaust duct of the gas turbine exhaust system. The second bracket is for connecting to an exhaust duct liner of the gas turbine exhaust system. The rod extends between the first bracket and the second bracket. The first ball joint connects a first end of the rod with the first bracket. The second ball joint connects a second end of the rod with the second bracket.

DETAILED DESCRIPTION

Figure 1:
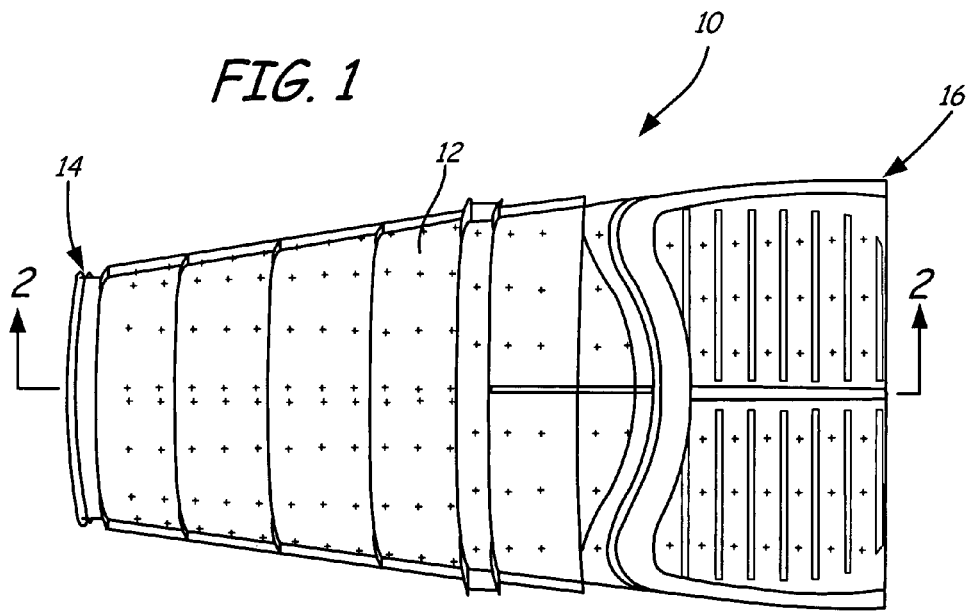
FIG. 1 shows a top view of complex-shaped exhaust duct for a gas turbine engine in which the self-aligning support hanger of the present invention is used.

FIG. 1 shows a top view of exhaust system 10 for a gas turbine engine in which self-aligning support hangers of the present invention are used. Exhaust system 10 includes exhaust duct 12, having upstream end 14 and downstream end 16. Upstream end 14 of exhaust duct 12 is typically supported at the downstream end of a gas turbine engine. As such, exhaust gas from the gas turbine engine travels through exhaust duct 12 and exits at downstream end 16. Exhaust duct 12 primarily acts to expel the discharged gases of the gas turbine engine from the fuselage of the aircraft in which the gas turbine engine is used. For example, exhaust duct 12 prevents the hot gases from entering the fuselage and damaging internal aircraft components. However, exhaust duct 12 must also comply with other demands of the gas turbine engine or the aircraft. For example, exhaust duct 12 may need to 1) fit within the confines of small unmanned aircraft, 2) comply with the geometries of low radar signature aircraft, or 3) perform thrust vectoring functions. As such, the shape of exhaust duct 12 can take on a complex shape as it extends in the axial direction along central axis A. For example, upstream end 14 of exhaust duct 12 comprises a circular cross section and downstream end 16 comprises a "racetrack" or oval shape, while the mid-span portion takes on a transitory egg-like shape. Upstream end 14 is positioned adjacent the core of the gas turbine engine and is therefore subjected to extremely high temperatures from the exhaust gas. The exhaust gas cools somewhat as it reaches downstream end 16, but nonetheless remains at a level typically beyond the temperature limitations of exhaust duct 12. Exhaust duct 12 is typically comprised of titanium-based alloys due to their high strength and low weight. Exhaust duct 12 is lined with an exhaust duct liner in order to shield exhaust duct 12 from the exhaust gas.

Figure 2:
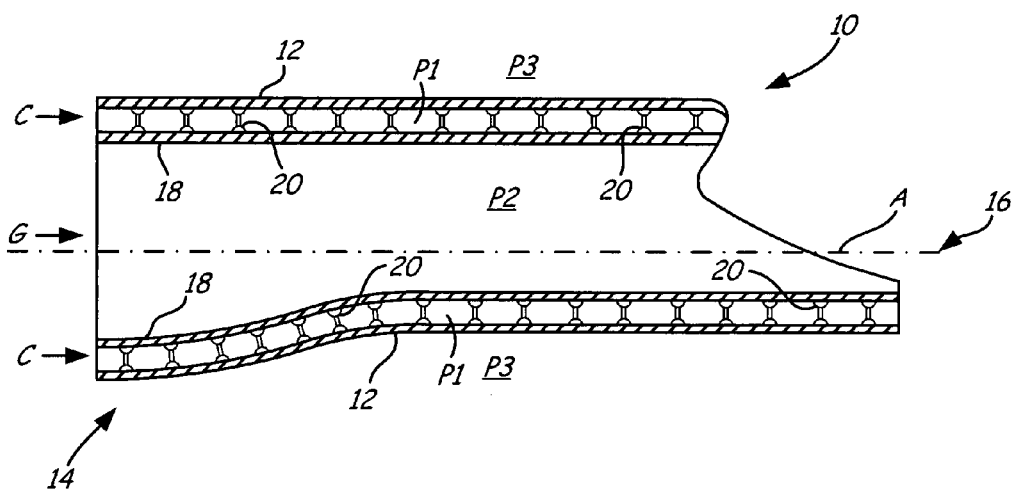
FIG. 2 shows a cross section of the exhaust duct of FIG. 1 illustrating an exhaust duct liner suspended from the exhaust duct using self-aligning support hangers.

FIG. 2 shows a cross sectional view of exhaust system 10 as taken at section 2-2 of FIG. 1. Exhaust system 10 comprises exhaust duct 12, exhaust duct liner 18 and self-aligning liner support hangers 20. Exhaust duct 12 extends from a gas turbine engine at upstream end 14 to downstream end 16, through an aircraft fuselage. In the particular embodiment shown, as can be seen if FIGS. 1 & 2, the top portion of exhaust duct 12 comprises a circular cross-section at upstream end 14, extends laterally in a generally horizontal manner, and widens to form an oval shape at downstream end 16. The bottom portion of exhaust duct 12 likewise begins as a circle and ends as an oval, but extends laterally in a contoured manner. Exhaust duct liner 18 has a profile matching that of exhaust duct 12, yet is smaller such that it fits within exhaust duct 12. Thus, exhaust duct 12 and duct liner 18 have complex shapes to meet the particular needs of the aircraft in which they will be used. Exhaust duct liner 18 is concentrically suspended from exhaust duct 12 by self-aligning liner support hangers 20 to shield exhaust duct 12 from the hot core gases. Exhaust duct liner 18 typically comprises a nickel-based alloy having a much higher melting point than the titanium-based duct 12. Hangers 20 are configured to maintain exhaust duct liner 20 uniformly spaced from exhaust duct 12 in the radial direction, while still permitting exhaust duct liner 20 to move in the axial and transverse directions, with respect to axis A.

Exhaust gas G enters exhaust duct liner 18 from the gas turbine engine at elevated temperatures and, as such, a temperature gradient is produced from upstream end 14 to downstream end 16. Additionally, since duct liner 18 shields exhaust duct 12 from exhaust gas G, a temperature differential is produced between duct liner 18 and exhaust duct 12. Thus, exhaust duct 12 and duct liner 18 are subjected to differing temperature profiles during operation of the gas turbine engine, which fluctuates as the gas turbine engine cycles up and cycles down while performing different maneuvers. Compounded by the difference in thermal expansion properties of exhaust duct 12 and duct liner 18, which can be up to about a factor of two for nickel and titanium, exhaust duct 12 and duct liner 18 undergo significantly different thermal deformations in use. For example, in the embodiment of FIG. 2, exhaust duct liner 18 comprises a single-sheet liner having a length of approximately 180 inches (~457.2 cm), which results in thermal expansion of over 1 inch (~2.54 cm), which can produce a relative shift from exhaust duct 12 of about 0.25 inches (~0.635 cm) in the axial direction and about 0.10 inches (~0.254 cm) in the transverse direction. Because of their complex shapes and differing materials, exhaust duct 12 and duct liner 18 do not, however, undergo the same deformation, which has a tendency to alter the spacing between exhaust duct 12 and duct liner 18. It is necessary, however, to maintain the spacing between exhaust duct 12 and duct liner 18 in order to maintain proper cooling of exhaust system 10.

Cooling air C, such as bleed air from the gas turbine engine compressor, is routed between exhaust duct 12 and duct liner 18 to reduce the thermal effects of exhaust gas G. Exhaust gas G and cooling air C produce a pressure differential between the interior of exhaust duct 12 and the interior of exhaust duct liner 18. For example, pressure P1 of cooling air C is typically greater than both pressure P2 of exhaust gas G and pressure P3 of the ambient air. As such, duct liner 18 is subject to compressive forces, and exhaust duct 12 is subject to tensile forces. Exhaust duct 12 is typically rigid and fixed in place as it extends through the fuselage of an aircraft and is thus mechanically restrained, while duct liner 18 is suspended within exhaust duct 12. Accordingly, exhaust duct 12 and duct liner 18 are subjected to different mechanical and thermal loads when used in conjunction with a gas turbine engine. Support hanger 20 is thus subjected to significant stresses as duct liner 18 shifts within exhaust duct 12. Support hanger 20 is, however, configured with spherical ball joints to permit multi-axis shifting of duct liner 18 in order to alleviate stress generated within support hanger 20. In one embodiment, exhaust system 10 includes as many as two hundred and forty self-aligning support hangers 20 which act to maintain duct liner 18 spaced approximately 2 inches (~5.08 cm) from exhaust duct 12.

Figure 3:
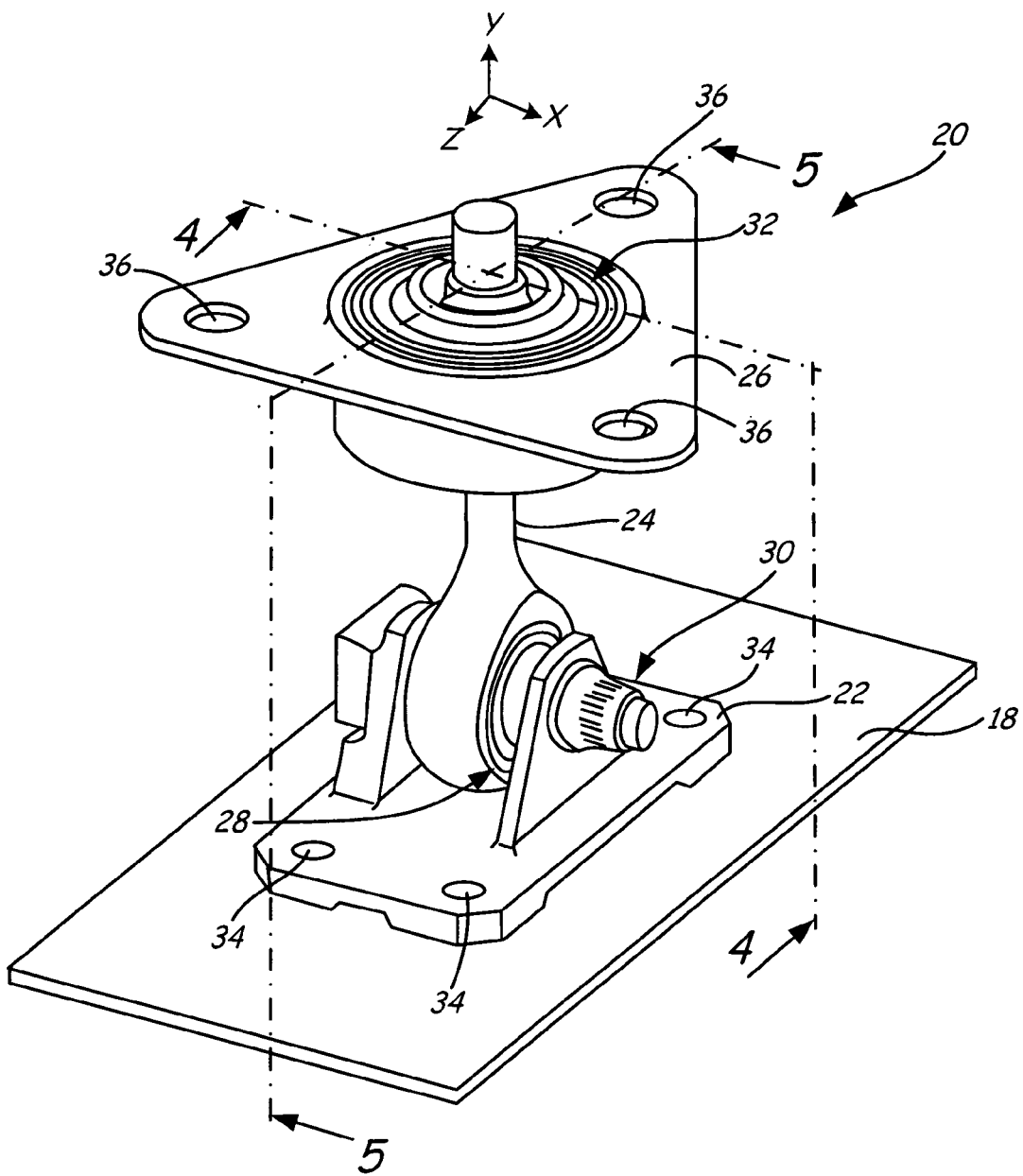
FIG. 3 shows a perspective view of a self-aligning support hanger of FIG. 2.

FIG. 3 shows a perspective view of self-aligning support hanger 20 of FIG. 2 connected with exhaust duct liner 18. Self-aligning support hanger 20 includes liner bracket 22, rod 24 and duct bracket 26. Liner bracket 22 is connected to rod 24 with first ball joint 28 and tie bolt 30, and duct bracket 26 is connected to rod 24 with second ball joint 32. Liner bracket 22 includes bores 34 such that liner bracket 22 can be attached to exhaust duct liner 18 with, for example, threaded fasteners. Likewise, duct bracket 26 includes bores 36 such that duct bracket 26 can be attached to exhaust duct 12 (FIG. 1) with, for example, threaded fasteners. Rod 24 connects liner bracket 22 and duct bracket 26 such that duct liner 18 is suspended within exhaust duct 12. First ball joint 28 and second ball joint 32 permit duct liner 18 to shift position within exhaust duct 12, but first ball joint 28 and second ball joint 32 remain a fixed point-to-point distance apart to maintain radial clearance.

Figure 4:
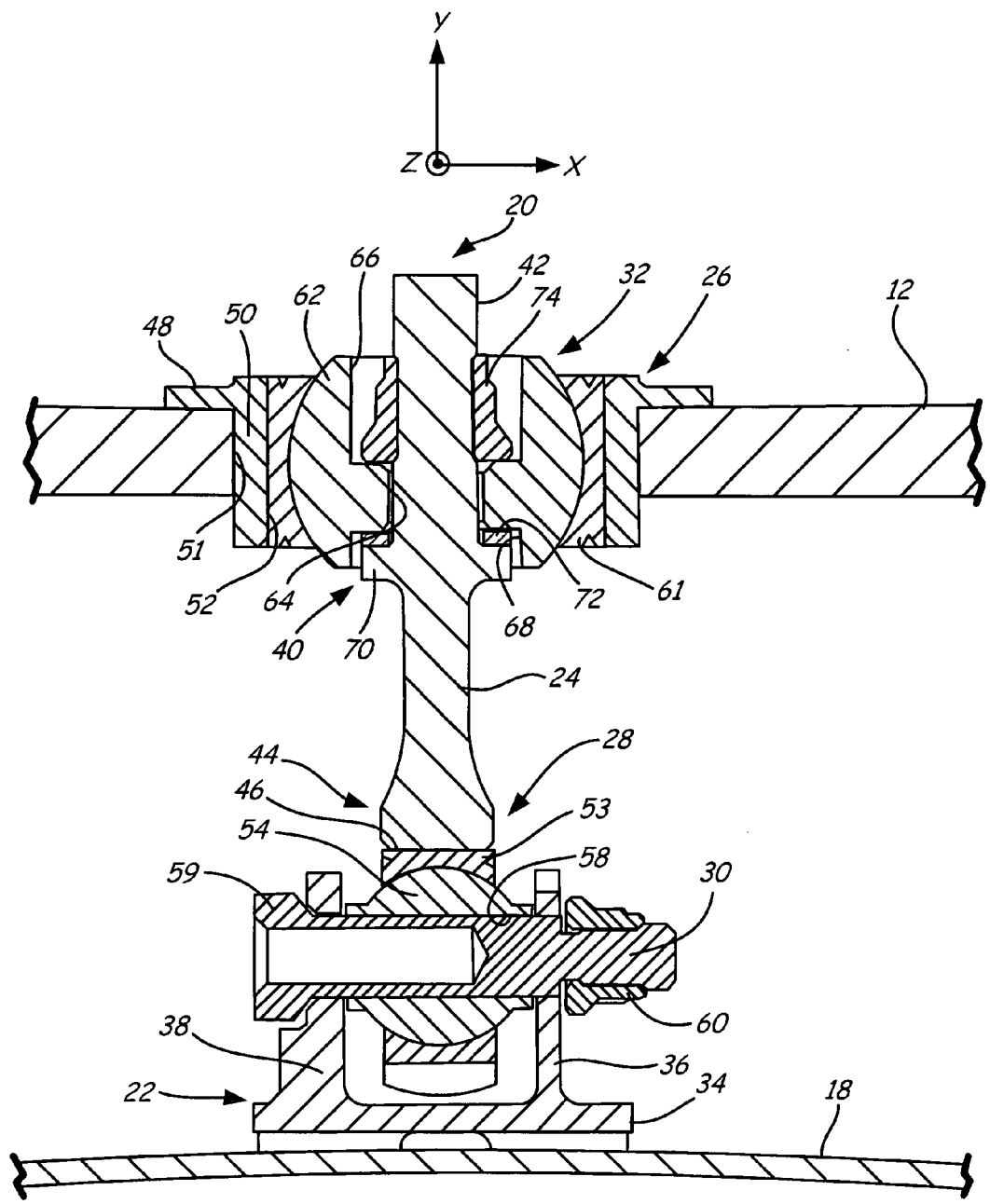
FIG. 4 shows a cross-sectional view of the self-aligning support hanger of FIG. 3 taken along line 4-4.

FIG. 4 shows a cross-sectional view of self-aligning support hanger 20 as taken at section 4-4 of FIG. 3. Support hanger 20 is disposed between exhaust duct 12 and exhaust duct liner 18. Support hanger 20 includes liner bracket 22, rod 24, duct bracket 26, first ball joint 28, tie bolt 30 and second ball joint 32. First ball joint 28 allows rod 24 to rotate within duct bracket 26 along three perpendicular axes at exhaust duct 12, such as, for example, the X, Y and Z axes. Likewise, second ball joint 32 permits rod 24 to rotate within liner bracket 22 along three perpendicular axes at duct liner 18. Tie bolt 30 permits easy assembly and disassembly of support hanger 20 such that duct liner 18 can be easily installed in and removed from duct 12 without completely disassembling support hanger 20.

Liner bracket 22 comprises base plate 34, first flange 36 and second flange 38. Rod 24 includes first end 40, which comprises threaded shaft 42, and second end 44, which comprises eye socket 46. Duct bracket 26 comprises flange plate 48 and collar 50. Base plate 34 of liner bracket 22 is rigidly connected to exhaust duct liner 18 with, for example, threaded fasteners. Exhaust duct liner 18 includes bores for aligning with bores 34 of base plate 34. First flange 36 and second flange 38 extend radially outwardly from base plate 34 and exhaust duct liner 18 toward exhaust duct 12. Tie bolt 30 comprises a pin or rod that spans the distance between first flange 36 and second flange 38. Tie bolt 30 comprises a pivot point for receiving first ball joint 28 upon which eye socket 46 of rod 24 is permitted to rotate.

Flange plate 48 of duct bracket 26 is rigidly connected to exhaust duct 12 with, for example, threaded fasteners. Exhaust duct 12 includes bores for aligning with bores 36 of flange plate 48. Duct bracket 26 is configured such that collar 50 extends radially inwardly from flange plate 48 to point towards duct liner 18. Exhaust duct 12 includes opening 51 for accepting collar 50 such that collar 50 is recessed within exhaust duct 12 and extends toward duct liner 18. Thus, duct bracket 26 does not extend far beyond the outer diameter of exhaust duct 12 such that exhaust duct 12 can be compactly positioned in an aircraft fuselage. Collar 50 includes opening 52 for connecting with second ball joint 32.

First ball joint 28 comprises first ball socket 53, which is disposed within eye socket 46, and first ball 54, which is disposed within ball socket 53. Ball 54, which comprises a spherical ball bearing, is disposed between first flange 36 and second flange 38 of liner bracket 22, and includes center bore 58. Tie bolt 30 is inserted into center bore 58 and bores in first flange 36 and second flange 38. Tie bolt 30, which comprises a shaft or rod, includes head 59 and nut 60, which prevent tie bolt 30 from disengaging first flange 36 and second flange 38. Typically, tie bolt 30 is force fit into first flange 36, second flange 38 and ball 54 such that a rigid connection is formed. Ball socket 53 is, however, permitted to rotate about the exterior of ball 54.

Second ball joint 32 comprises second ball socket 61 and second ball 62. Second ball socket 61 is disposed within collar 50 of duct bracket 26, and second ball 62 is disposed within second ball socket 61. Second ball 62, which comprises a spherical ball bearing, includes recessed bore 64, which is recessed within second ball 62 between first counterbore 66 and second counterbore 68. Shaft 42 at first end 40 of rod 24 is inserted into recessed bore 64. Shaft 42 extends through recessed bore a sufficient distance such that nut 74 can be properly torqued onto shaft 42. Shaft 42 includes flange 70, which is configured for insertion into either counterbore 66 or counterbore 68 such that flange 70 abuts recessed bore 64. Counterbore 66 extends into second ball 62 deeper than counterbore 68 such that recessed bore 64 is not centered within second ball 62. Accordingly, the position of recessed bore 64 within collar 50 is adjustable such that the distance rod 24 extends from duct bracket 26 can be adjusted. The adjustable position of recessed bore 64 allows for manufacturing and assembly tolerance variance such that the distance between exhaust duct 12 and duct liner 18 can be maintained at a uniform distance using stock parts. For a 2 inch (~5.08 cm) nominal spacing between duct liner 18 and exhaust duct 12, an acceptable tolerance band is approximately 1.8 (~4.572 cm) inches to about 2.2 (~5.588 cm) inches. The distance between exhaust duct 12 and duct liner 18 can be further manipulated by placing shim 72 between flange 70 and recessed bore 64 to keep the spacing within the tolerance band and near the nominal value. Shim 72 comprises a washer or some other such spacer made of any suitable material to restrict the insertion of shaft 42 into second ball 62. In one embodiment, shim 72 has a nominal thickness of approximately 30/1000 of an inch (~0.0762 cm). Once second ball 62 is oriented in the desired position and a properly sized shim 72, if any, is positioned around shaft 42, shaft 42 is inserted into recessed bore 64 such that nut 74 can be affixed to shaft 42 to connect rod 24 to exhaust duct 12.

As can be seen in FIG. 4, first ball joint 28 and second ball joint 32 are oriented such that center axes of each ball joint are perpendicular to each other, or offset ninety degrees from each other. Specifically, shaft 42 of rod 24 extends through the center axis of second ball 62 along the Y axis. Tie bolt 30 extends through the center axis of first ball 54 along the X axis. This not only assists in permitting multi-axis movement of duct liner 18, but results in a more compact, hardier design of support hanger 20. First ball joint 28 and second ball joint 32 each bear loads from rod 24 in radial and axial directions. Load bearing capability is greater in the radial direction rather than the axial direction. First ball joint 28 and second ball joint 32 are, however, taller in the radial direction rather than the axial direction. Furthermore, the axial load can be increased by increasing the diameter of ball 54 or ball 62. For these reasons, second ball 62 is designed to receive shaft 42 in its axial configuration. As such, second ball joint 32 does not extend far beyond the exterior of exhaust duct 12, but the diameter can be increased to achieve the desired axial load bearing strength. Accordingly, second ball 62 is larger than first ball 54. However, the specific design and orientation of ball joints 28 and 32 can be varied based on design and space constraints. For example, in another embodiment of the invention, shaft 42 of rod 24 can be configured to extend through the center axis of second ball 62 and first ball 54 along the Y axis (i.e. first ball joint 28 can be configured similarly to second ball joint 32). In another embodiment of the invention, second ball 62 can be configured to receive a tie bolt that extends through the center axis of second ball 62 along the X axis (i.e. second ball joint 32 can be configured similarly to first ball joint 28). Thus, first ball joint 28 and second ball joint 32 can be configured such that center axes of each ball joint are parallel to or co-linear with each other.

First ball joint 28 and second ball joint 32 permit rod 24 to rotate at liner bracket 22 and duct bracket 26. Exhaust duct 12 is held in a fixed position through its attachment with the gas turbine engine and aircraft fuselage into which it is installed. A plurality of support hangers 24 are used to suspend duct liner 18 within exhaust duct 12 such that each rod 24 of the plurality of support hangers 20 connects a local portion of exhaust duct 12 to a local portion of duct liner 18. For each support hanger 20, first ball joint 28 is held at a fixed distance to second ball joint 32. However, first ball joint 28 and second ball joint 32 permit duct liner 18 to shift radially and axially within exhaust duct 12. Each local portion of duct liner 18 is permitted to swing from rod 24 due to ball joint 32, and to rotate in three axes at duct liner 18 due to ball joint 28. However, through the cumulative effect of the plurality of support hangers 20 used to hang duct liner 18 within exhaust duct 12, each local portion of duct liner 18 is held at an approximate fixed distance from the local portion of exhaust duct 12 as rod 24 holds first ball joint 28 at a fixed distance to second ball joint 32. A higher density of support hangers 20 used to attach duct liner 18 results in better uniformity of the spacing of duct liner 18.

Figure 5:
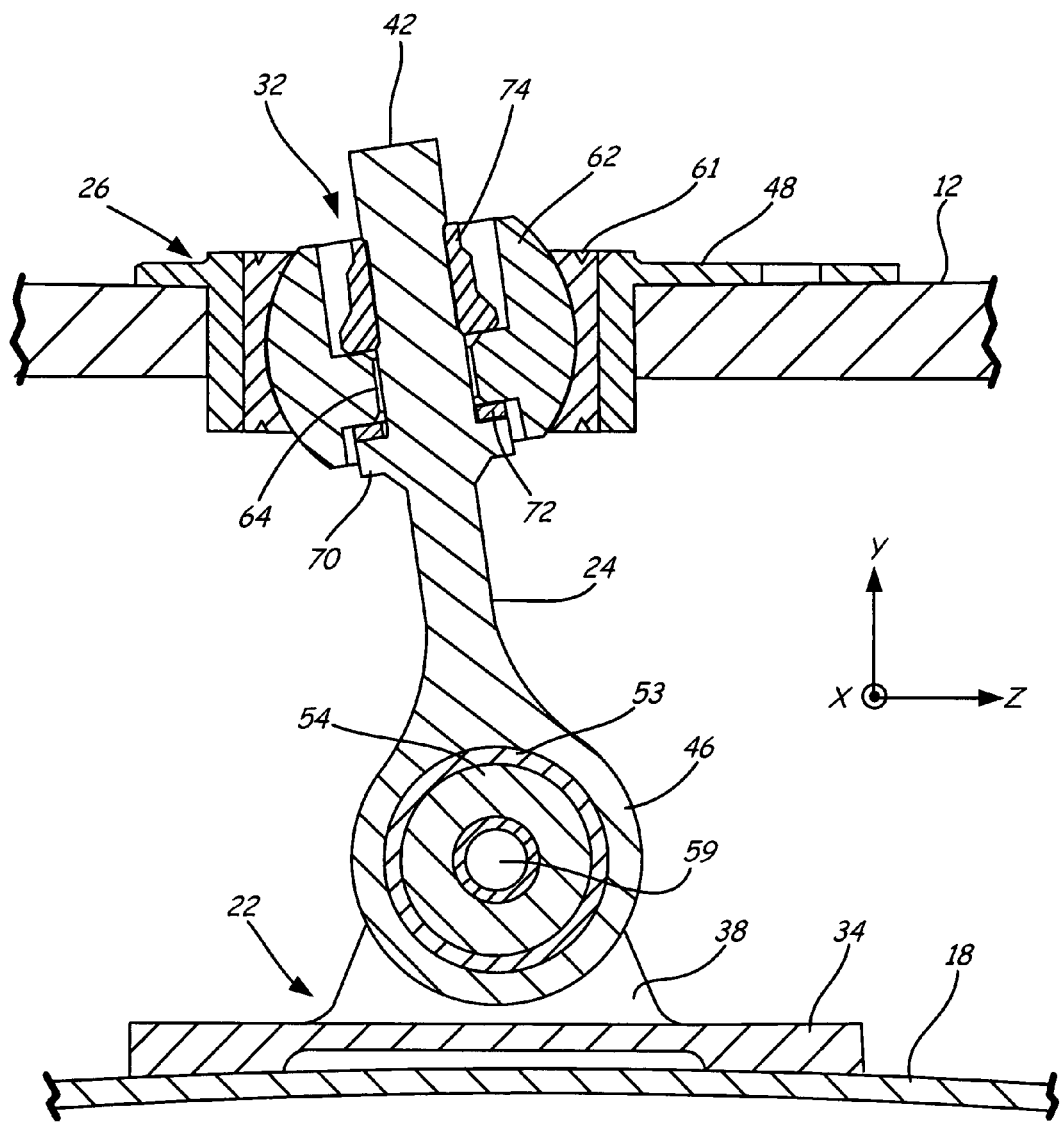
FIG. 5 shows a cross-sectional view of the self-aligning support hanger of FIG. 3 taken along line 5-5 illustrating relative motion between the exhaust duct and the exhaust duct liner in a first direction.

FIG. 5 shows a cross-sectional view of self-aligning support hanger 20 of FIG. 3 illustrating movement between exhaust duct 12 and exhaust duct liner 18 in a first direction. Self-aligning support hanger 20 links duct liner 18 with exhaust duct 12 such that duct liner 18 is free to shift within exhaust duct 12 in a plurality of directions. For example, due to different temperatures at exhaust duct 12 and duct liner 18, and due to different thermal expansion rates between exhaust duct 12 and duct liner 18, duct liner 18 shifts position. As shown in FIG. 5, support hanger 20 permits duct liner 18 to undergo a lateral shift in the Z direction. As duct liner 18 shifts position, liner bracket 22 also shifts, pulling along second end 44 of rod 24. Eye socket 46 of rod 24, which includes ball socket 53, rotates around first ball 54 of ball joint 28, while shaft 42 of rod 24 induces a rotation of second ball 62. Second ball 62 rotates within ball socket 61 of second ball joint 32, which is seated within collar 50 of duct bracket 26. Accordingly, rod 24 moves in a pendulum-like fashion. Rod 24 maintains spacing between duct bracket 26 and liner bracket 22 approximately parallel. The distance between duct bracket 26 and liner bracket 22, however, changes slightly as rod 24 takes on a diagonal position between exhaust duct 12 and duct liner 18. However, due to the cumulative effect of multiple support hangers 20 being distributed between exhaust duct 12 and duct liner 18, the spacing between duct 12 and liner 18 is maintained within the acceptable tolerance band.

Figure 6:
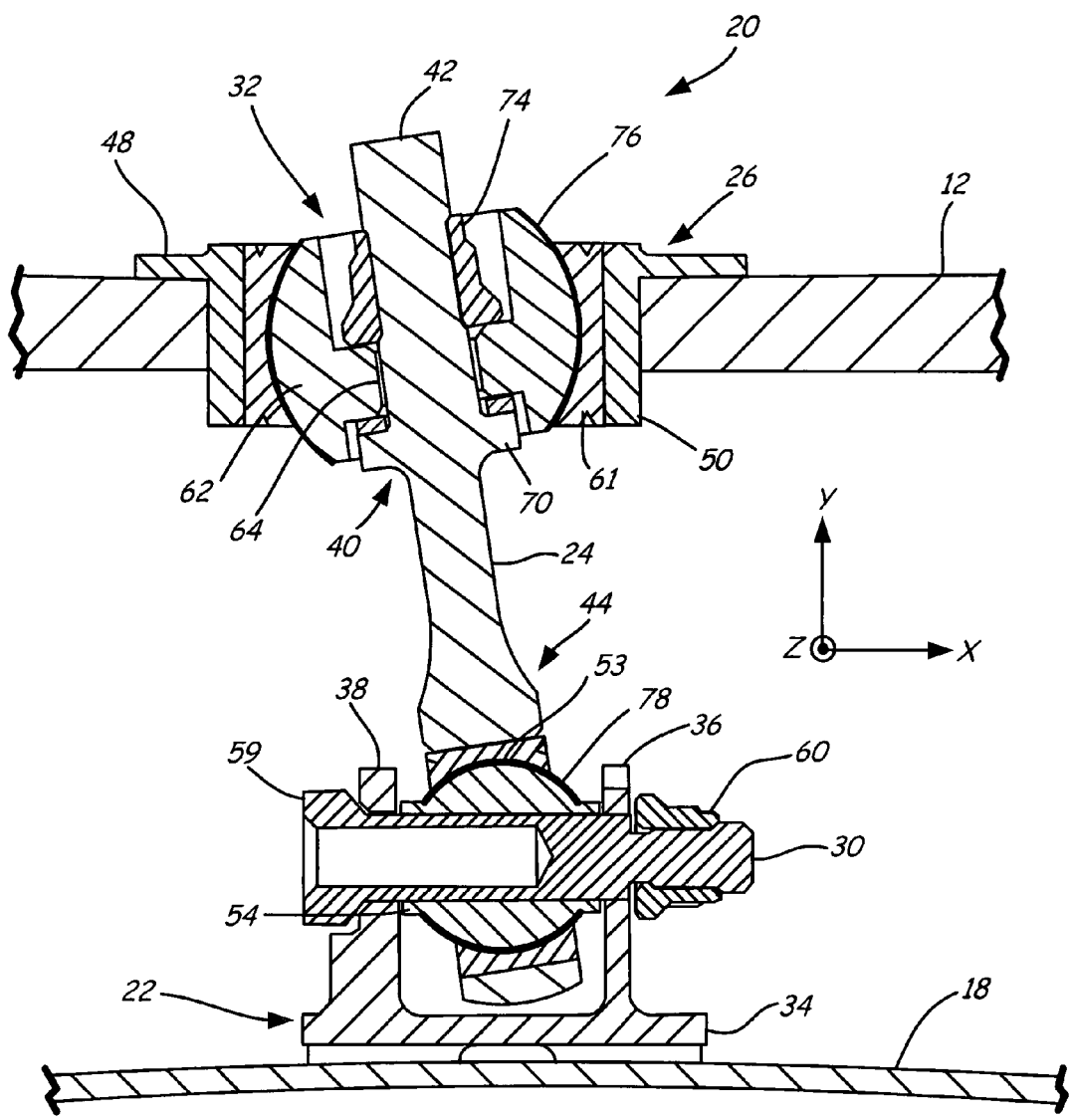
FIG. 6 shows a cross-sectional view of the self-aligning support hanger of FIG. 3 taken along line 4-4 illustrating relative motion between the exhaust duct and the exhaust duct liner in a second direction.

FIG. 6 shows a cross-sectional view of self-aligning support hanger 20 of FIG. 3 illustrating relative motion between exhaust duct 12 and the exhaust duct liner 18 in a second direction. Similar to movement in the Z direction shown in FIG. 5, first ball joint 28 and second ball joint 32 of support hanger 20 also permit duct liner 18 to undergo a lateral shift in the X direction. The distance between flanges 36 and 38, however, limits the movement of rod 24 in the X direction. As such the geometry of flanges 36 and 38 and liner bracket 22 can be varied to permit a wider angle of rotation. Specifically, flanges 36 and 38 can be spaced further apart on base plate 34 to permit rod 24 to rotate further around first ball 54.

Movement of duct liner 18 is further facilitated by including liner material within each ball joint. Specifically, first ball joint 28 includes wear material 76, and second ball joint 32 includes wear material 78. Wear material 76 and wear material 78 comprise any low-friction, high-wear resistant material that also has high temperature capability. Wear material 76 and wear material 78 act as lubrication barriers between first ball 62 and first ball socket 61, and second ball 54 and second ball socket 53 (FIG. 4), respectively. However, the particular properties of the wear materials are selected based on design needs and the engine with which exhaust duct 12 will be used. For example, second ball 62 is subjected to lower temperatures since it is spaced further away from duct liner 18, but is, however, subjected to greater loads since second ball joint 32 must support duct liner 18. Thus, wear material 76, which surrounds second ball 62, may be comprised of a material having lower temperature capability, but higher strength limitations than wear material 78, which surrounds first ball 54. In one embodiment, wear material 76 and wear material 78 comprise cloth material comprising weaved threads of Teflon® material adhered to first ball 54 and second ball 62, respectively.

Any suitable material can be used for the various components of support hanger 20. Materials having low weight, high strength and high temperature limits are particularly well suited for support hanger 20. Suitable materials include nickel and titanium based alloys, such as Inconel® 718 or various Hastelloy alloys. Additionally, the specific size and dimensions of the various components of support hanger 20 can be varied based on design needs to produce self-aligning support hangers according to the present invention. Support hangers of the present invention provide a compact, easily assembled and disassembled means for suspending a duct liner within an exhaust duct. Through the use of spherical ball bearings, the support hanger permits axial and lateral movement of the duct liner within the exhaust duct, while maintaining radial spacing between the exhaust duct and the duct liner within an acceptable tolerance band. The support hanger thus allows the duct liner to independently move and undergo thermal growth without unacceptably stressing the components of the support hanger or deforming the duct liner.

Although the present invention has been described with reference to preferred embodiments, workers skilled in the art will recognize that changes may be made in form and detail without departing from the spirit and scope of the invention.

The invention claimed is:

1. A self-aligning hanger for use in a gas turbine engine exhaust system, the hanger comprising:
  a first bracket connecting to an exhaust duct of the gas turbine exhaust system; a second bracket for connection to an exhaust duct liner of the gas turbine exhaust system;
  a rod extending between the first bracket and the second bracket, the rod comprising a shaft and an eye socket located at distal ends of the rod, respectively;
  a first ball joint for connecting a first end of the rod with the first bracket, the first ball joint comprising: a first ball socket; and a first ball seated within the first ball socket and having a first bore extending through the first ball along a first center axis; and
  a second ball joint for connecting a second end of the rod with the second bracket, the second ball joint comprising: a second ball socket; and a second ball seated within the second ball socket and having a second bore extending through the second ball along a second center axis; wherein the shaft of the rod extends into one of the first bore and the second bore.

2. The self-aligning hanger of claim 1 wherein the first center axis of the first ball joint is rotated ninety degrees with respect to the second center axis of the second ball joint.

3. The self-aligning hanger of claim 1 wherein the first end of the rod comprises the shaft and the second end of the rod comprises the eye socket.

4. The self-aligning hanger of claim 3 wherein the first ball socket is seated within the first bracket and wherein the first bore comprises a recessed bore for receiving the shaft of the first end of the rod.

5. The self-aligning hanger of claim 4 wherein the shaft of the first end of the rod includes a flange for seating within the recessed bore.

6. The self-aligning hanger of claim 5 and further comprising a shim positioned between the recessed bore and the flange.

7. The self-aligning hanger of claim 4 wherein the recessed bore is off-center within the first ball.

8. The self-aligning hanger of claim 4 wherein the first bracket comprises:
  a plate for mounting around an opening in the exhaust duct; and
  a collar for receiving the first ball socket of the first ball joint, wherein the collar extends from the plate such that the plate is able to lie flush with the exhaust duct while the collar is able to extend into the opening in the exhaust duct.

9. The self-aligning hanger of claim 1 wherein the second bracket comprises:
  a base for mounting to the exhaust duct liner;
  a first flange extending from the base;
  a second flange extending from the base; and
  a pin shaft extending between the first flange and the second flange.

10. The self-aligning hanger of claim 9 wherein:
  the second ball socket is seated within the eye socket of the second end of the rod; and
  the second bore receives the pin shaft of the second bracket.

11. The self-aligning hanger of claim 1 wherein the first center axis of the first ball joint extends in a direction in which the second center axis of the second ball joint extends.

12. A suspension system for hanging an exhaust duct liner in a gas turbine engine exhaust duct, the suspension system comprising:
  a rod comprising:
    a first end having a first ball; and
    a second end having a first ball socket;
  a first bracket connecting to either the exhaust duct liner or the gas turbine engine exhaust duct and having a second ball socket for receiving the first ball of the rod; and
  a second bracket for connection to either the exhaust duct liner or the gas turbine engine exhaust duct and having:
    a second ball for insertion into the first ball socket of the rod; and a first shaft for securing the second ball to the second bracket.

13. The suspension system of claim 12 wherein the second bracket comprises:
  a base for mounting to the exhaust duct liner;
  a first flange extending from the base and positioned alongside a first side of the first ball socket;
  a second flange extending from the base and positioned opposite the first flange alongside the first ball socket; and
  wherein the first shaft extends between the first flange and the second flange and passes through the second ball.

14. The suspension system of claim 12 wherein the first bracket comprises:

a plate for mounting around an opening in the exhaust duct; and a collar having the second ball socket oriented in the radial direction for receiving the first ball, wherein the collar extends from the plate such that the plate is able to lie flush with the exhaust duct while the collar is able to extend into the opening in the exhaust duct.

15. The suspension system of claim 14 wherein the first end of the rod comprises a second shaft and the first ball includes a recessed bore for receiving the second shaft, wherein the recessed bore is off-center within the first ball.

16. The suspension system of claim 15 wherein the second shaft of the first end of the rod includes a collar for seating against the recessed bore.

17. The suspension system of claim 16 wherein the first ball is secured to the second shaft of the rod with a nut, and wherein the recessed bore is positioned such that the nut is recessed within the first ball.

18. The suspension system of claim 12 and further comprising:
   a first wear material placed between the first ball and the second ball socket; and
   a second wear material placed between the second ball and the first ball socket.

19. A suspension system for hanging and exhaust duct liner within an exhaust duct of a gas turbine engine, the suspension system comprising:
   an exhaust duct;
   an exhaust duct liner; and
   a hanger connecting the exhaust duct and the exhaust duct liner, the hanger comprising:
      a rod for making a point to point connection between the exhaust duct and the exhaust duct liner, wherein the rod limits radial displacement of the liner from the duct; and
      first and second ball and socket joints for connecting ends of the rod with the duct and the liner, wherein the ball and socket joints permit axial and transverse movement of the liner with respect to the duct;
   wherein a central axis of the first ball and socket joint is aligned in an axial direction and a central axis of the second ball and socket joint is aligned in a radial direction with respect to a central axis of the exhaust duct.

20. A self-aligning hanger for use in a gas turbine engine exhaust system, the hanger comprising:
   a first bracket connecting to an exhaust duct of the gas turbine exhaust system;
   a second bracket for connection to an exhaust duct liner of the gas turbine exhaust system;
   a rod extending between the first bracket and the second bracket, the rod Comprising:
      a shaft positioned at a first end of the rod; and
      an eye socket positioned at a second end of the rod;
   a first ball joint for connecting a first end of the rod with the first bracket,
      the first ball joint extending along a first center axis, the first ball joint comprising:
         a first ball socket seated within the first bracket; and a first ball seated within the first ball socket;
         wherein the first ball includes a recessed bore for receiving the shaft of the first end of the rod; and
   a second ball joint for connecting a second end of the rod with the second bracket the second ball joint extending along a second center axis,
      wherein the second center axis is rotated ninety degrees with respect to the first center axis.

21. A self-aligning hanger for use in a gas turbine engine exhaust system, the hanger comprising:
   a first bracket connecting to an exhaust duct of the gas turbine exhaust system;
   a second bracket for connection to an exhaust duct liner of the gas turbine exhaust system, the second bracket comprising:
      a base for mounting to the exhaust duct liner;
      a first flange extending from the base;
      a second flange extending from the base; and
      a shaft extending between the first flange and the second flange;
   a rod extending between the first bracket and the second bracket,
      the rod comprising
      a shaft positioned at a first end of the rod; and
      an eye socket positioned at a second end of the rod;
   a first ball joint for connecting a first end of the rod with the first bracket, the
      first ball joint extending along a first center axis; and
   a second ball joint for connecting a second end of the rod with the second bracket the second ball joint extending along a second center axis, wherein the second center axis is rotated ninety degrees with respect to the first center axis.

22. A suspension system for hanging an exhaust duct liner in a gas turbine engine exhaust duct, the suspension system comprising:
   a rod comprising:
      a first end having:
         a first ball having a recessed bore, wherein the recessed bore is off-center within the first ball; and
         a shaft having a collar, wherein the recessed bore receives the shaft
            such that the collar seats against the recessed bore;
         a nut that secures the first ball to the shaft, wherein the nut is recessed within the recessed bore; and
      a second end having a first ball socket;
   a first bracket connecting to either the exhaust duct liner or the gas turbine engine exhaust duct
      and having a second ball socket for receiving the first ball of the rod; and
   a second bracket for connection to either the exhaust duct liner or the gas turbine engine exhaust duct and having a second ball for insertion into the first ball socket of the rod.

* * * * *